(12) United States Patent
Li et al.

(10) Patent No.: US 10,735,509 B2
(45) Date of Patent: Aug. 4, 2020

(54) SYSTEMS AND METHODS FOR SYNCHRONIZING MICROSERVICE DATA STORES

(71) Applicant: CA, INC., San Jose, CA (US)

(72) Inventors: Qing Li, Cupertino, CA (US); Min Hao Chen, Milpitas, CA (US); Wenjing Wang, Sunnyvale, CA (US)

(73) Assignee: CA, Inc., San Jose, CA (US)

( * ) Notice: Subject to any disclaimer, the term of this patent is extended or adjusted under 35 U.S.C. 154(b) by 214 days.

(21) Appl. No.: 15/885,762

(22) Filed: Jan. 31, 2018

(65) Prior Publication Data

US 2019/0238636 A1 Aug. 1, 2019

(51) Int. Cl.
*H04L 29/08* (2006.01)
*G06F 16/27* (2019.01)
*G06F 9/50* (2006.01)

(52) U.S. Cl.
CPC ........ *H04L 67/1095* (2013.01); *G06F 9/5088* (2013.01); *G06F 16/27* (2019.01); *H04L 67/20* (2013.01)

(58) Field of Classification Search
CPC ... G06F 9/5088; G06F 16/27; H04L 67/1095; H04L 67/20
See application file for complete search history.

(56) References Cited

U.S. PATENT DOCUMENTS

| | | | |
|---|---|---|---|
| 10,194,276 B1* | 1/2019 | Singamsetty | H04W 4/33 |
| 2007/0297366 A1* | 12/2007 | Osann | H04W 40/06 370/331 |
| 2014/0287818 A1* | 9/2014 | Chan | A63F 13/12 463/24 |
| 2016/0162370 A1* | 6/2016 | Mehta | G06F 16/162 707/610 |
| 2018/0270125 A1* | 9/2018 | Jain | H04L 67/1097 |

* cited by examiner

*Primary Examiner* — Brian J. Gillis
*Assistant Examiner* — Juan C Turriate Gastulo
(74) *Attorney, Agent, or Firm* — FisherBroyles, LLP

(57) ABSTRACT

The disclosed computer-implemented method for synchronizing microservice data stores may include (i) establishing, at a first network node, an instance of a first microservice for an application and an instance of a distinct second microservice, (ii) establishing, at a distinct second network node, an additional instance of the first microservice and an additional instance of the distinct second microservice, (iii) establishing a single network channel for synchronizing, between the first network node and the distinct second network node, a first data store for the first microservice and a second data store for the distinct second microservice, and (iv) synchronizing the first data store for the first microservice and the second data store for the distinct second microservice. Various other methods, systems, and computer-readable media are also disclosed.

20 Claims, 8 Drawing Sheets

SYSTEMS AND METHODS FOR SYNCHRONIZING MICROSERVICE DATA STORES

BACKGROUND

In general, modern cloud microservices may deploy a centralized database to store service data. Unfortunately, this solution may encounter some challenges. First, the solution is not scalable. Second, the solution introduces synchronization requirements between instances of the microservice and the centralized database. Third, the solution may render high availability of the microservice contingent upon high availability of the centralized database. These challenges may introduce a separation between the microservice itself and the underlying data on which the microservice operates. In some examples, this solution may involve uninterrupted connection between instances of the microservice and the centralized database in order for the microservice to operate correctly.

To address the shortcomings of the centralized data store approach, some microservices may maintain a replicated data store for each instance of the microservice. Nevertheless, this approach faces increasing challenges in terms of synchronizing the data stores between the instances of the data stores as the microservice scales out and more instances are created. The instant disclosure, therefore, identifies and addresses a need for improved systems and methods for synchronizing microservice data stores. Other related systems and improvements are also discussed below.

SUMMARY

As will be described in greater detail below, the instant disclosure describes various systems and methods for synchronizing microservice data stores. In one example, a computer-implemented method for synchronizing microservice data stores may include (i) establishing, at a first network node, an instance of a first microservice for an application and an instance of a distinct second microservice, (ii) establishing, at a distinct second network node, an additional instance of the first microservice and an additional instance of the distinct second microservice, (iii) establishing a single network channel for synchronizing, between the first network node and the distinct second network node, a first data store for the first microservice and a second data store for the distinct second microservice, and (iv) synchronizing, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels.

In one embodiment, a synchronization engine schedules a transmission of at least one network packet based on the analysis of the context information for both the first microservice and the distinct second microservice and the network packet includes within a payload data from both the first microservice and the distinct second microservice. In one embodiment, the context information defines at least two of: (i) a specification of delay tolerance, (ii) an indication of whether encryption is applied, (iii) a specification of an update frequency, and (iv) a priority categorization.

In some examples, synchronizing the first data store for the first microservice and the second data store for the distinct second microservice enables high availability of intra-transaction data for a cloud service according to a high availability protocol. In some examples, synchronizing the first data store for the first microservice and the second data store for the distinct second microservice is performed as part of a third-party cloud computing service provided by a security vendor that ensures a level of security to protect users of the application.

In one embodiment, the first network node and the distinct second network node belong to a cloud computing cluster. In one embodiment, all nodes belonging to the cloud computing cluster are homogeneous such that the cloud computing cluster functions as a full mesh network without a static master node. In some examples, the full mesh network is self-healing. In one embodiment, all nodes belonging to the cloud computing cluster dynamically synchronize the first data store for the first microservice and the second data store for the distinct second microservice such that each node belonging to the cloud computing cluster maintains access to the first data store for the first microservice and the second data store for the distinct second microservice. In further examples, synchronizing, across the single network channel between the first network node and the distinct second network node, the first data store for the first microservice and the second data store for the distinct second microservice reduces a number of network channels in comparison to synchronizing the first data store and the second data store independently across two separate network channels.

In one embodiment, a system for implementing the above-described method may include (i) an establishment module, stored in memory, that: (a) establishes, at a first network node, an instance of a first microservice for an application and an instance of a distinct second microservice, (b) establishes, at a distinct second network node, an additional instance of the first microservice and an additional instance of the distinct second microservice, and (c) establishes a single network channel for synchronizing, between the first network node and the distinct second network node, a first data store for the first microservice and a second data store for the distinct second microservice, (ii) a synchronization module, stored in memory, that synchronizes, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels, and (iii) at least one physical processor configured to execute the establishment module, and the synchronization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) establish, at a first network node, an instance of a first microservice for an application and an instance of a distinct second microservice, (ii) establish, at a distinct second network node, an additional instance of the first microservice and an additional instance of the distinct second microservice, (iii) establish a single network channel for synchronizing, between the first network node and the distinct second network node, a first data store for the first microservice and a second data store for the distinct second microservice, and (iv) synchronize, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
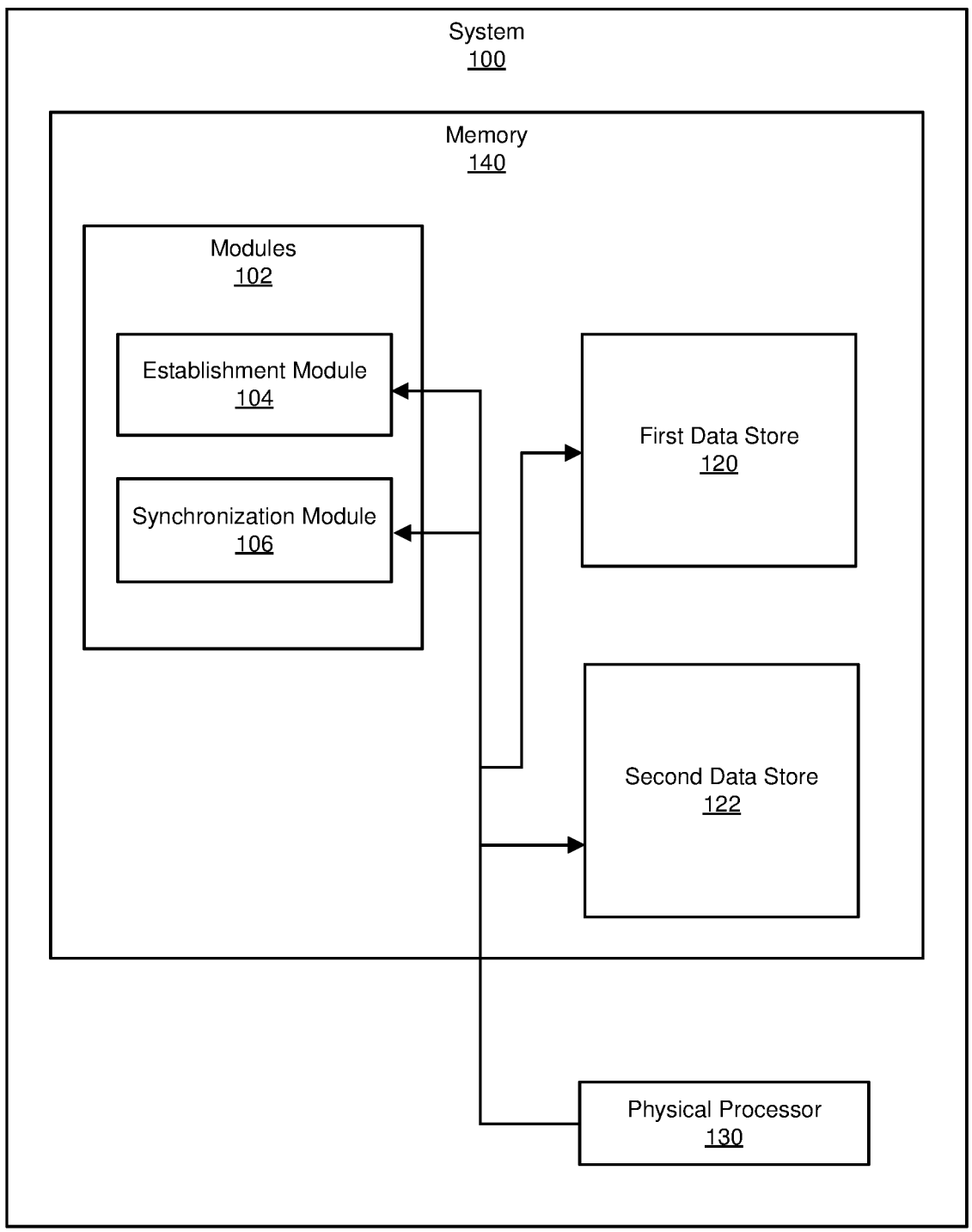
FIG. 1 is a block diagram of an example system for synchronizing microservice data stores.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for synchronizing microservice data stores, and one network node assuming ownership of all in-progress transactions from a distinct second microservice from a second network node. As described further below, the disclosed subject matter may enable high availability of microservices, as well as high availability of the underlying data on which the microservices operate. The high availability of these microservices may be defined in terms of a high availability protocol and/or availability threshold. In some examples, the underlying data on which the microservices operate may include transaction data, including data describing a transaction that is not yet completed, as discussed further below. The disclosed subject matter may also improve upon related systems by reducing a number of network channels for synchronizing microservice data stores, which may further reduce complexity and streamline installation and maintenance.

Figure 2:
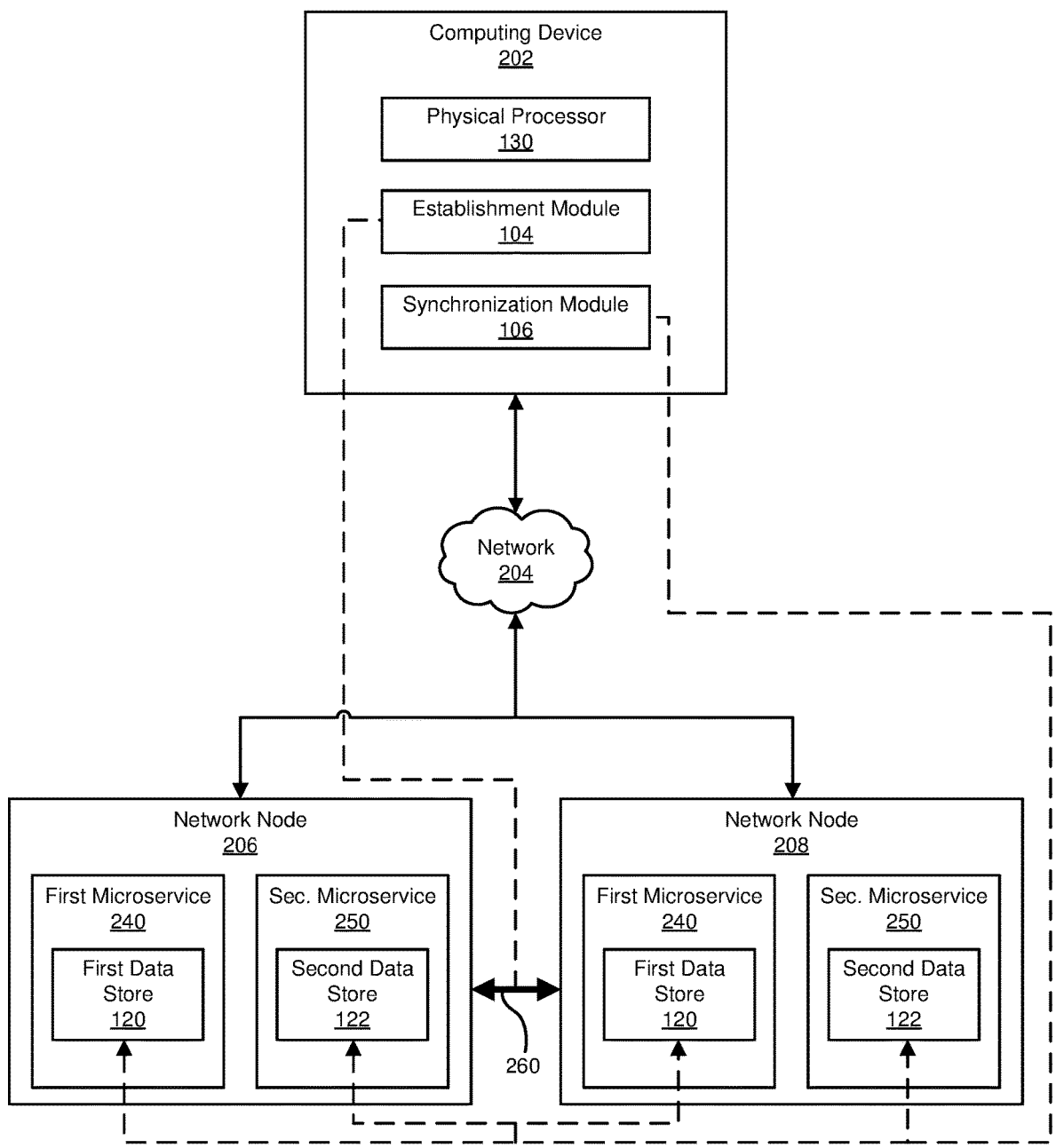
FIG. 2 is a block diagram of an additional example system for synchronizing microservice data stores.

The following will provide, with reference to FIGS. 1-2, detailed descriptions of example systems for synchronizing microservice data stores. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for synchronizing microservice data stores. As illustrated in this figure, example system 100 may include one or more modules 102 for performing one or more tasks. For example, and as will be explained in greater detail below, example system 100 may include an establishment module 104 that establishes, at a first network node, an instance of a first microservice for an application and an instance of a distinct second microservice. Establishment module 104 may also establish at a distinct second network node, an additional instance of the first microservice and an additional instance of the distinct second microservice. Furthermore, establishment module 104 may also establish a single network channel for synchronizing, between the first network node and the distinct second network node, a first data store 120 for the first microservice and a second data store 122 for the distinct second microservice. Example system 100 may additionally include a synchronization module 106 that synchronizes, across the single network channel between the first network node and the distinct second network node, first data store 120 for the first microservice and second data store 122 for the distinct second microservice, such that the synchronizing is adjusted based on an analysis of context information for both the first microservice and the distinct second microservice, rather than synchronizing first data store 120 and second data store 122 independently across two separate network channels. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or network node 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate synchronizing microservice data stores. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network node 206 via a network 204. In one example, all or a portion of the functionality of modules 102 may be performed by computing device 202, network node 206, and/or any other suitable computing system. As will be described in greater detail below, one or more of modules 102 from FIG. 1 may, when executed by at least one processor of computing device 202 and/or network node 206, enable computing device 202 and/or network node 206 to synchronize microservice data stores.

For example, and as will be described in greater detail below, establishment module 104 may establish, at first network node 206, an instance of a first microservice 240 for an application and an instance of a distinct second microservice 250. Establishment module 104 may also establish, at a distinct second network node 208, which may parallel first network node 206 in structure and/or configuration, an additional instance of first microservice 240 and an additional instance of distinct second microservice 250. Furthermore, establishment module 104 may establish a single network channel 260 for synchronizing, between first network node 206 and distinct network node 208, first data store 120 for first microservice 240 and second data store 122 for distinct second microservice 250. Synchronization module 106 may synchronize, across single network channel 260 between first network node 206 and distinct second network node 208, first data store 120 for first microservice 240 and second data store 122 for distinct second microservice 250, such that the synchronizing is adjusted based on an analysis of context information for both first microservice 240 and distinct second microservice 250, rather than synchronizing first data store 120 and second data store 122 independently across two separate network channels.

Computing device 202 generally represents any type or form of computing device capable of reading computer-executable instructions. One illustrative example of computing device 202 may include a server or modular computing host within a cloud computing cluster. In general, computing device 202 may correspond to any computing device configured to manage one or more members of a cloud computing cluster in accordance with method 300, as discussed further below.

Network node 206 generally represents any type or form of computing device that is capable of executing a microservice for a cloud computing service, in accordance with method 300, and as discussed further below. Additional examples of network node 206 include, without limitation, security servers, application servers, web servers, storage servers, and/or database servers configured to run certain software applications and/or provide various security, web, storage, and/or database services. Although illustrated as a single entity in FIG. 2, network node 206 may include and/or represent a plurality of servers that work and/or operate in conjunction with one another.

Network 204 generally represents any medium or architecture capable of facilitating communication or data transfer. In one example, network 204 may facilitate communication between computing device 202 and network node 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
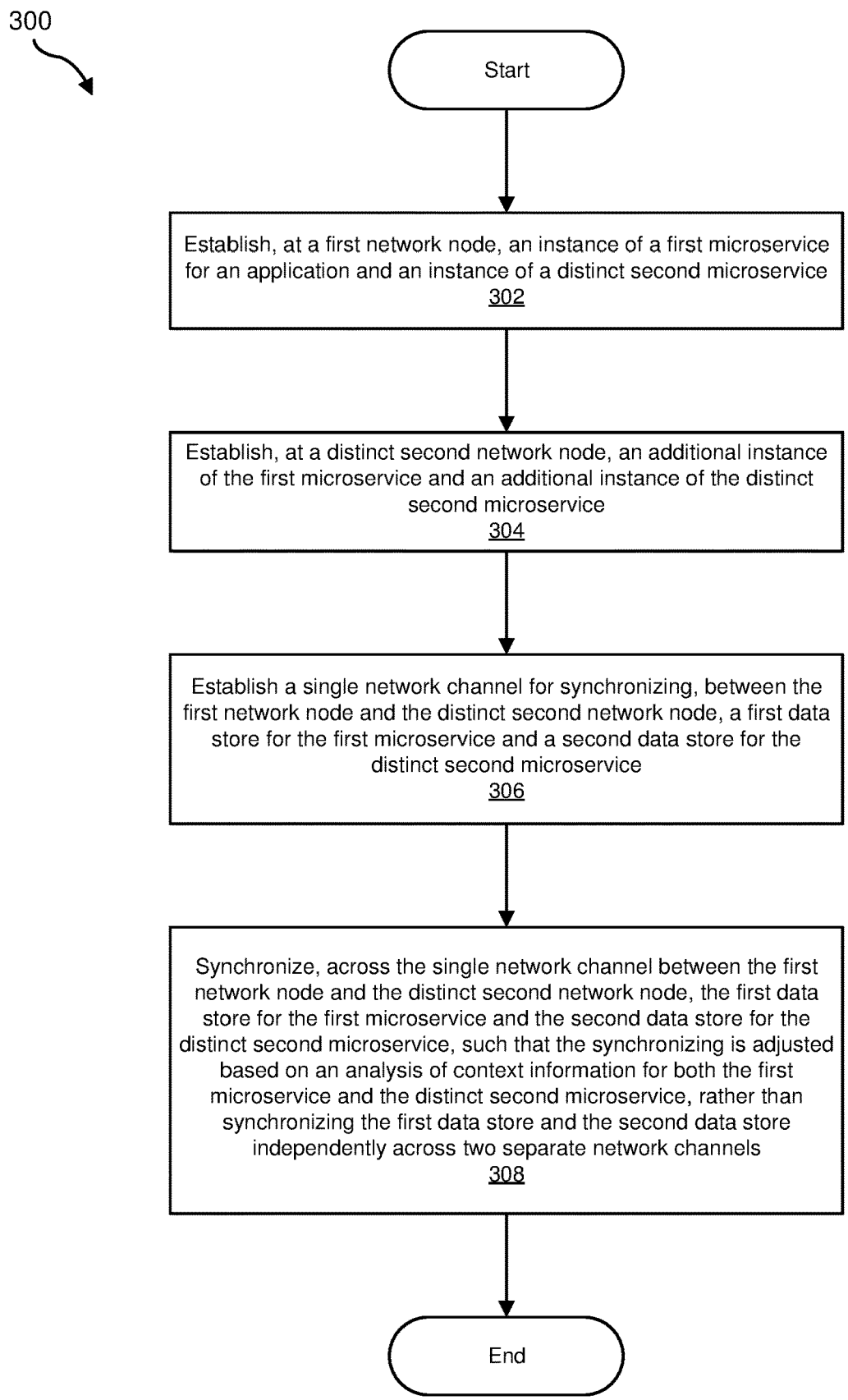
FIG. 3 is a flow diagram of an example method for synchronizing microservice data stores.

FIG. 3 is a flow diagram of an example computer-implemented method 300 for synchronizing microservice data stores. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may establish, at a first network node, an instance of a first microservice for an application and an instance of a distinct second microservice. For example, establishment module 104 may, as part of computing device 202 in FIG. 2, establish, at first network node 206, an instance of first microservice 240 for an application and an instance of distinct second microservice 250.

As used herein, the term "microservice" generally refers to a modular component within an application that performs a specific task in accordance with a service-oriented software architecture. In some examples, the application may correspond to an online web service, such as an online retailer or banking service. Illustrative examples of microservices may include performing credit card transactions, executing search queries, and/or executing user login and/or authentication procedures. Moreover, as used herein, the term "distinct second microservice" generally refers to any microservice that is distinct, or different, from the first mentioned microservice (e.g., first microservice 240 as distinct from microservice 250). In alternative embodiments, the distinct second microservice referenced throughout method 300 may be replaced by the same microservice, such that steps 302 and 304 refer to four separate instances of the same microservice. Furthermore, both first microservice 240 and microservice 250 may execute as part of the same application (e.g., both execute as part of AMAZON.COM), or instead execute as part of two separate and distinct applications (e.g., one may execute as part of AMAZON.COM and another may execute as part of USBANK.COM).

In general, the online web service may use a cloud computing platform or cluster to service user requests. The cloud computing platform may include a multitude of different nodes, hosts, and/or servers. Illustrative examples of these nodes include network node 206 and network node 208.

Establishment module 104 may establish the first microservice and the distinct second microservice in a variety of ways. In general, establishment module 104 may establish a microservice as part of executing the corresponding application. In some examples, establishment module 104 may establish a microservice in response to a user interaction, such as a user request, query, and/or command (or other user input). For example, a user may request to login to an online web service, such as an online banking service. In response, establishment module 104 may establish (e.g., execute) a microservice that corresponds to the user login and/or authentication procedures. Similarly, a user may attempt to purchase an item using an online retailer, such as AMAZON. In response, establishment module 104 may establish the microservice that handles credit card transactions for purchasing items accordingly. In additional or alternative examples, establishment module 104 may establish a microservice whenever execution of a corresponding application reaches a point where the microservice is called or requested.

At step 304, one or more of the systems described herein may establish, at a distinct second network node, an additional instance of the first microservice and an additional instance of the distinct second microservice. For example, establishment module 104 may, as part of computing device 202 in FIG. 2, establish, at distinct second network node 208, an additional instance of first microservice 240 and an additional instance of distinct second microservice 250.

Establishment module 104 may perform step 304 in a variety of ways. In general, establishment module 104 may perform step 304 in any manner that parallels the performance of step 302, as further described above. In some examples, establishment module 104 may perform step 302 and step 304 in parallel or simultaneously. In other examples, establishment module 104 may perform step 302 and step 304 in serial such that establishment module 104 performs step 302 before performing step 304, or vice versa. In general, establishment module 104 may establish, at the distinct second network node, an instance of the first microservice and an additional instance of the distinct second microservice as part of a cloud computing cluster that relies on redundancy, and a multitude of cluster nodes, in order to process a high volume of microservice requests or user interactions. For example, in the case that the instance of first microservice 240 at first network node 206 is occupied with processing a user interaction, then an additional user interaction may be processed at the additional instance of first microservice 240 at distinct second network node 208. In this manner, a large number of cluster nodes may enable the overall system, such as system 200, to accommodate a large number of microservice requests or user interactions.

At step 306, one or more of the systems described herein may establish a single network channel for synchronizing, between the first network node and the distinct second network node, a first data store for the first microservice and a second data store for the distinct second microservice. For example, establishment module 104 may, as part of computing device 202 in FIG. 2, establish single network channel 260 for synchronizing, between first network node 206 and distinct second network node 208, first data store 120 for first microservice 240 and second data store 122 for distinct second microservice 250.

Establishment module 104 may establish the single network channel in a variety of ways. In general, establishment module 104 may establish the single network channel by establishing a single network connection. The single network connection may include a TRANSMISSION CONTROL PROTOCOL, STREAM CONTROL TRANSMISSION PROTOCOL, INTERNET PROTOCOL, and/or USER DATAGRAM protocol network connection. The single network connection may begin with a network handshake that establishes the network connection. The single network connection may enable two separate network nodes, such as first network node 206 and distinct second network node 208, to communicate by including data within the payload section of network packets transmitted across the network connection between two corresponding network addresses. More specifically, the single network channel enables one microservice data store to replicate from one network node, such as first network node 206, to another network node, such as distinct second network node 208, by including data of the microservice data store within the payload section of the network packets. In general, a cloud computing cluster that includes first network node 206 and distinct second network node 208 may automatically, and dynamically, propagate any changes to any microservice data store to all instances of the corresponding microservice within the cloud computing cluster, thereby satisfying a high availability protocol.

Figure 4:
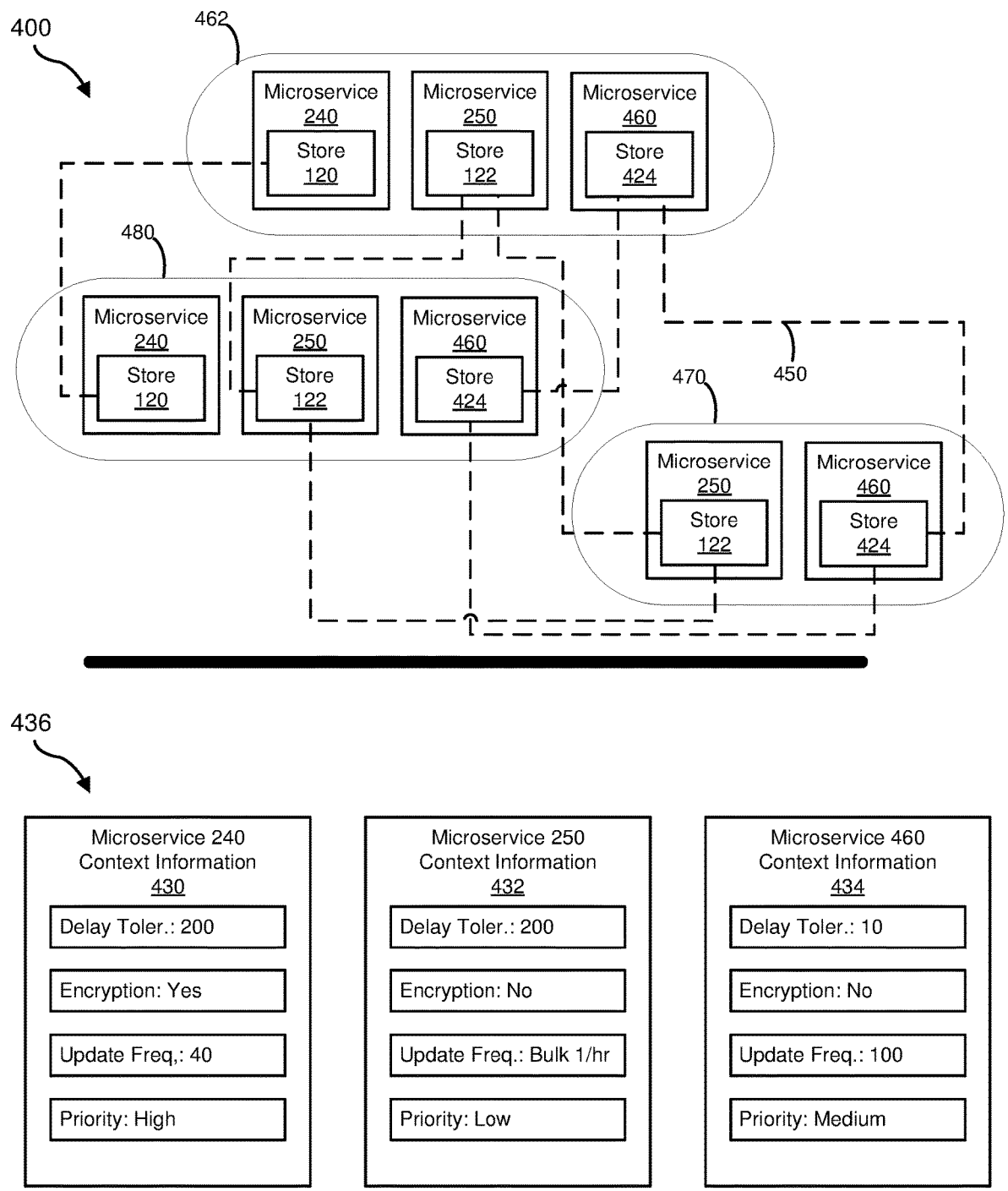
FIG. 4 is a block diagram of an example cloud computing cluster.

As discussed further below, by establishing the single network channel, establishment module 104 may enable a synchronization engine to manage, or adjust, the synchronization of one microservice data store based on an analysis or consideration of one or more factors (e.g., context information) relating to an additional microservice data store. In contrast, related systems may synchronize microservice data stores using separate network channels, in a matter such that the synchronization of one microservice data store is independent of the synchronization of the other microservice data store. In other words, the synchronization of one microservice data store is configured without any consideration of the synchronization of the other microservice data store. For example, FIG. 4 shows a block diagram of a set 400 of network nodes, network node 462, network node 480, and network node 470, which are configured according to a related system. As shown in this diagram, the various microservices may replicate their data stores between different instances of the same respective microservice. This replication may include both full synchronization (in which entire data sets are compared and synchronized) and/or incremental synchronization (in which only changes to underlying data are transmitted, thereby conserving network bandwidth and other network resources). For example, the instance of first microservice 240 at network node 462 replicates its data store 120 to the instance of first microservice 240 at network node 480. In this example, each instance of a microservice establishes a separate network channel, such as a network channel 450 shown in FIG. 4, to replicate the corresponding data store. In this particular example, this configuration of the related system results in seven separate network channels or network connections.

FIG. 4 also shows a set of tables 436, which includes a table 430, a table 432, and a table 434. As further shown in this figure, table 430 specifies context information for microservice 240. Table 432 specifies context information for microservice 250. And table 434 specifies context information for a microservice 460. As further shown in this diagram, each table of context information specifies a delay tolerance that indicates how long a microservice can tolerate a delay in terms of a network connection or data store synchronization (e.g., in terms of milliseconds), an indication of whether encryption is applied to the microservice data store or network connection, an update frequency for updating the microservice data store (e.g., in terms of milliseconds), and a priority categorization in comparison to other microservices. For example, in table 430 the context information relating to microservice 240 specifies a delay tolerance of 200 milliseconds, specifies that encryption will be applied, specifies an update frequency of 40 milliseconds, and specifies a priority categorization of "HIGH." Table 432 and table 434 list parallel items of context information for microservice 250 and microservice 460, respectively. Moreover, these items of context information are merely illustrative. In other examples, the context information for a microservice may specify any item of information that defines, at least in part, a configuration for synchronizing a corresponding microservice data store (e.g., an encoding scheme for encoding data or a compression scheme for compressing data).

Returning to the block diagram of set 400 of the network nodes, the seven network channels shown in this block diagram may replicate corresponding microservice data stores independently of each other and without an analysis or consideration of context information for other microservices. For example, the instance of microservice 460 at network node 462 may replicate data store 424 to the instance of microservice 460 at network node 470 across network channel 450, but do so in a manner that is independent of, and does not analyze, factor, or consider, any context information for the replication of the other microservice data stores at network node 462 and/or network node 470. More specifically, the instance of microservice 460 at network node 462 may replicate data store 424 to the instance of microservice 460 at network node 470 without any consideration of the context information for microservice 250 shown in table 432 and/or the context information for microservice 240 shown in table 430.

At step 308, one or more of the systems described herein may synchronize, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels. For example, synchronization module 106 may, as part of computing device 202 in FIG. 2, synchronize, across single network channel 260 between first network node 206 and distinct second network node 208, first data store 120 for first microservice 240 and second data store 122 for distinct second microservice 250, such that the synchronizing is adjusted based on an analysis of context information, such as the context information shown in FIG. 4, for both first microservice 240 and distinct second microservice 250, rather than synchronizing first data store 120 and second data store 122 independently across two separate network channels.

As used herein, the phrase "synchronize the first data store for the first microservice and the second data store of the distinct second microservice" generally refers to ensuring that two separate network nodes both have the same content or data for the first data store, and also that both have the same content or data for the second data store (although, of course, the data for the first data store and the data for the second data store may be different). In general, synchronizing the first data store for the first microservice and the second data store for the distinct second microservice may be performed by synchronization module 106 replicating each respective data store from one network node to another network node.

Figure 5:
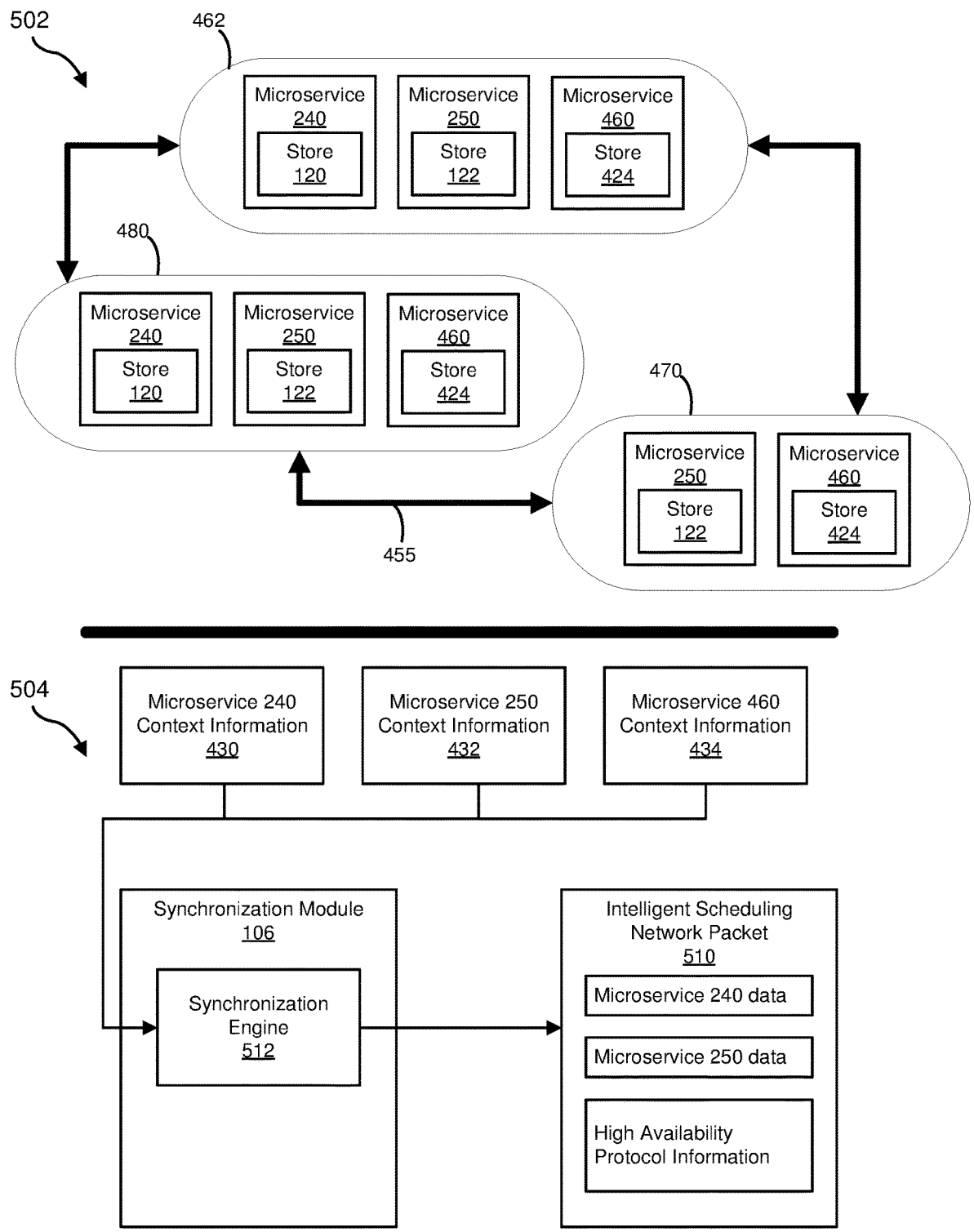
FIG. 5 is an additional block diagram of an example cloud computing cluster.

Synchronization module 106 may synchronize the first data store for the first microservice and synchronize the second data store for the distinct second microservice in a variety of ways. In one embodiment, synchronization module 106 synchronizing the first data store for the first microservice and the second data store for the distinct second microservice reduces a number of network channels in comparison to synchronizing the first data store and the second data store independently across two separate network channels. FIG. 5 helps illustrate this embodiment. This figure includes a block diagram of a set 502 of network nodes, which correspond to set 400 shown in FIG. 4. In contrast to set 400 shown in FIG. 4, set 500 shown in FIG. 5 includes only three network channels, such as a network channel 455 shown in FIG. 5, which connect the three network nodes 462, 480, and 470 to each other. Accordingly, in this embodiment in which synchronization module 106 has performed step 308 of method 300, the number of network channels has been reduced in comparison to the related system shown in FIG. 4. More specifically, establishment module 104 and synchronization module 106 have effectively reduced the number of network channels from seven to three. In general, modules 102 have accomplished this reduction in network channels by establishing network channels at the level of network nodes (e.g., cloud computing cluster nodes, servers, or hosts) rather than establishing network nodes at the level of microservice instances. Because there are fewer network nodes than microservice instances, elevating the level of network channels from the level of microservice instances to the level of cloud computing cluster nodes effectively reduces the number of network channels. Moreover, reducing the number of network channels effectively reduces the complexity of the cloud computing cluster and thereby streamlines and improves installation and maintenance.

In additional or alternative embodiments, a synchronization engine, as part of synchronization module 106, schedules a transmission of at least one network packet based on the analysis of the context information for both the first microservice and the distinct second microservice. Furthermore, in these examples, the network packet optionally includes within a payload data from both the first microservice and the distinct second microservice. Returning to FIG. 5, this figure further includes a workflow diagram 504 that illustrates how a synchronization engine 512, within synchronization module 106, may generate and/or schedule an intelligent scheduling network packet 510 based upon input that may include the context information from table 430, table 432, and table 434, which are also shown in more detail in FIG. 4. In other words, synchronization engine 512 operates at a level that is external to any single specific microservice and operates at a level that makes context information for a multitude of different microservices available for consideration and analysis. Accordingly, synchronization engine 512 may factor, or consider, context information for the totality of microservice 240, microservice 250, and microservice 460 when generating one or more network packets, such as intelligent scheduling network packet 510.

Moreover, as further shown in FIG. 5, these network packets may include data for multiple distinct second microservices. In the specific example of this figure, intelligent scheduling network packet 510 includes data for microservice 240 and also data for microservice 250 (e.g., in this arbitrary illustration, synchronization engine 512 may have determined to skip the inclusion of any data for microservice 460 within this specific network packet based on a consideration of the context information for microservice 460 that is included within table 434). Intelligent scheduling network packet 510 may be "intelligent" in the sense that it is generated, and/or scheduled, by synchronization engine 512, which has access to context information from multiple distinct second microservices and may, therefore, adjust the synchronization of one microservice data store based on a consideration of one or more items of context information for another microservice data store. In general, synchronization engine 512 may consider the totality of requests, specifications, requirements, thresholds, and/or other items of context information, for multiple microservices. Synchronization engine 512 may then construct and/or schedule one or more network packets to transmit data for synchronizing multiple microservice data stores in a manner that satisfies, or optimizes, performance according to these items of context information.

Intelligent scheduling network packet 510 also optionally includes high availability protocol information that specifies metadata, or configuration data, for ensuring high availability of underlying microservice data store data. In contrast to some related systems, synchronization engine 512 may only use a single high availability protocol, across a single network channel, which reduces complexity of the overall system. The related systems may involve a multitude of distinct second microservices each attempting to use their own high availability protocol, which increases complexity and introduces problems with scaling the overall system.

In some examples, synchronization module 106 may synchronize the first data store for the first microservice and the second data store for the distinct second microservice in a manner that enables high availability of intra-transaction data for a cloud service according to a high availability protocol. As used herein, the term "intra-transaction data" refers to data that specifies a state, or configuration, of a user interaction with an application, such as an online web application (e.g., an online retailer such as AMAZON and/or an online banking service) prior to the user interaction with a corresponding microservice completing. For example, intra-transaction data may define the state of a user being in the process of purchasing an item from an online retailer prior to the user actually completing the purchase. Similarly, intra-transaction data may define the state of the user being in the process of transferring money from one online banking account to another online banking account, but prior to the user actually completing the transfer. In these examples, the user may have already indicated one or more inputs to the online web service that navigated through one or more states of a corresponding microservice. Accordingly, the user may value preserving this state information without the online web service requesting for the user to repeat any steps or inputs. For example, if one node of a cloud computing cluster fails for some reason, the user would still desire to preserve the intra-transaction data that defines where the user was in the process of interacting with a microservice prior to the microservice actually completing the requested functionality. Similarly, if a user switches geographic locations (or an aspect of the user's network connection switches geographic locations), then the user is still desiring to preserve the intra-transaction data, even though a node within a different geographic location is now handling the execution of the microservice (e.g., because the new node is closer to the geographic location associated with the user's network connection). Accordingly, high availability of intra-transaction data prevents this undesirable situation from occurring by automatically and dynamically propagating intra-transaction data to all network nodes within the cluster that include an instance of the corresponding microservice.

In some examples, synchronization module 106 may perform step 308 as part of a third-party cloud computing service provided by a security vendor that ensures a level of security to protect users of the application. For example, an enterprise organization, such as AMAZON or U.S. BANK may desire to host, and execute, their online web services using a cloud computing service provider. Along these lines, the enterprise organization may select a cloud computing service that is provided by a security vendor, such as SYMANTEC. The security vendor may ensure that its cloud computing service is configured to provide a level of security to protect users of online web services that execute on the cloud computing service. The security vendor may also optionally apply a security policy to a user (e.g., a user of the online web services). The security policy may be mobile in the sense that the cloud computing service provider will apply the security policy to the user, and the user's interactions with the cloud computing system, wherever the user may go (i.e., the security policy follows the user regardless of geographic and/or network location).

Figure 6:
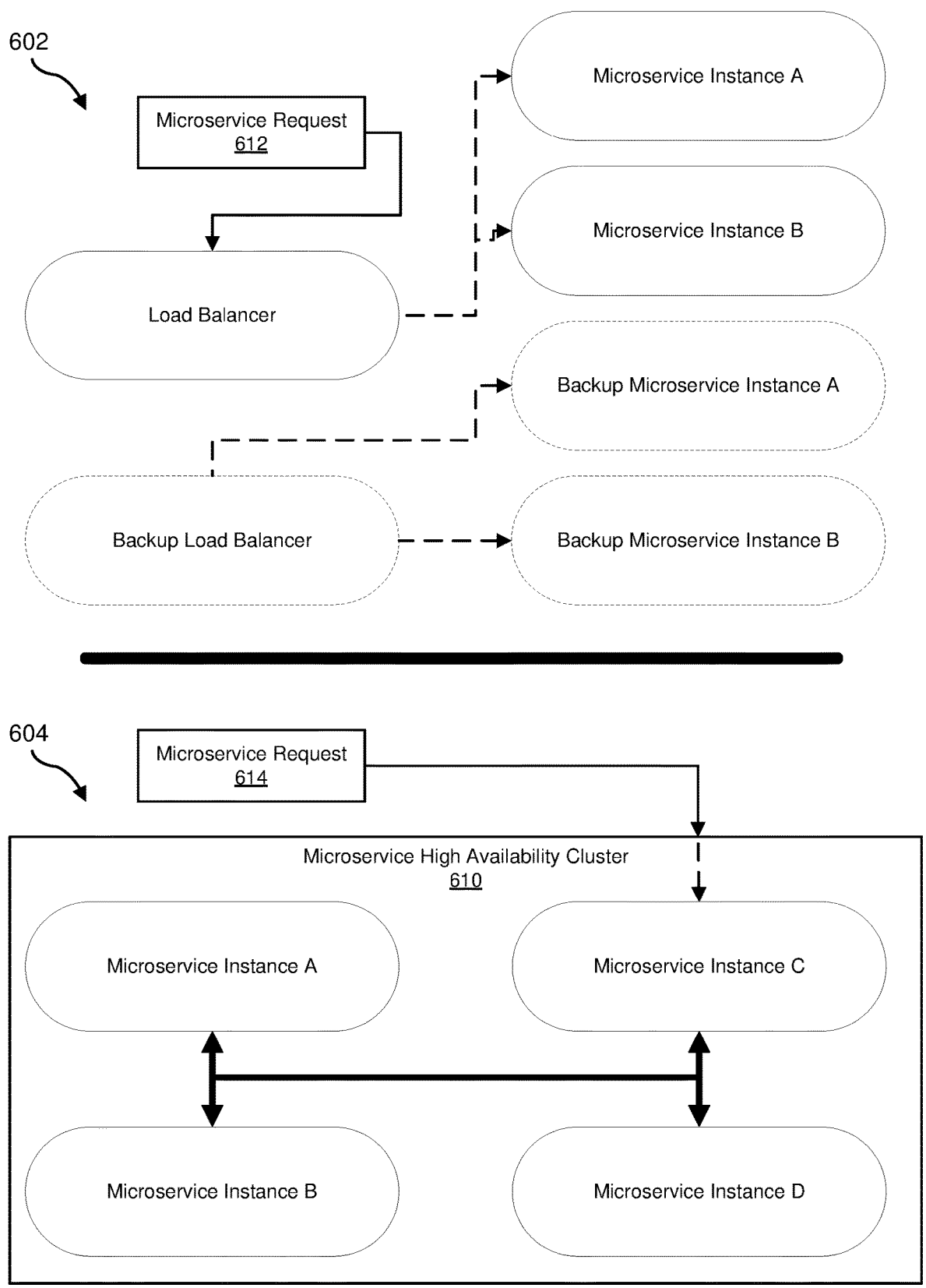
FIG. 6 is another block diagram of an example cloud computing cluster.

FIG. 6 illustrates additional embodiments of the disclosed subject matter. Specifically, this figure includes a workflow diagram 602 of a related cloud computing service that relies on a load balancer. As shown in this figure, the load balancer may receive a microservice request 612 and then the load balancer may decide which specific microservice instance and/or which specific network node will handle the request. For example, the load balancer may decide whether microservice instance A or microservice instance B will handle microservice request 612, as further shown in FIG. 6. Accordingly, the load balancer in workflow diagram 602 constitutes a single point of failure. In other words, if the load balancer fails, this failure would substantially impair the functioning of the overall cloud computing cluster, because a remaining set of network nodes, including the network nodes executing microservice instance A and microservice instance B, are not configured to readily take over the position of load balancer. Because of this potential failure, the related system of workflow diagram 602 may also include a backup load balancer, as further shown in FIG. 6. Moreover, in this embodiment, backup load balancer is configured to allocate microservice request 612 to a backup microservice instance A and/or a backup microservice instance B, as further shown in FIG. 6. Yet the additional inclusion, installation, and configuration of the backup load balancer, backup microservice instance A, and backup microservice instance B only further increases the complexity and scaling problems associated with the related system of workflow diagram 602.

In contrast, FIG. 6 also shows a workflow diagram 604, in accordance with system 200 and method 300, in which a parallel microservice request 614 is received by a microservice high availability cluster 610. Microservice high availability cluster 610 may include first network node 206 and distinct second network node 208, and may also potentially include other nodes. Microservice high availability cluster 610 may synchronize data (e.g., data store data and/or intra-transaction data) between different microservice instances included within the cluster in accordance with method 300. In the example of workflow diagram 604, these instances may include microservice instance A, microservice instance B, microservice instance C, and microservice instance D.

As further shown in workflow diagram 604, in some embodiments all nodes belonging to the cloud computing cluster are homogeneous such that the cloud computing cluster functions as a full mesh network without a static master node. For example, microservice high availability cluster 610 does not include a load balancer, a master node, and/or any other leadership node that is configured in a manner to be privileged above, or to manage, a remaining set of nodes.

In contrast, all of the nodes belonging to the cloud computing cluster are homogeneous and may, for example, all execute the same algorithm. The algorithm may decide how a particular network node should respond to the failure of another network node. The algorithm may also determine which network node should take over an active transaction that was being processed by the network node that failed, and/or optionally further determine when this takeover process should occur. In other words, all of the nodes belonging to the cloud computing cluster may be equally prepared, and suited, to perform a load-balancing, management, leader election, and/or leadership function for the overall cloud computing cluster. Moreover, all of the nodes belonging to the cloud computing cluster may be able to perform these functions due to the high availability of microservice data store information (e.g., transaction and/or microservice state information) at each of the nodes, which is shared between all of the microservice instances in real time, as further discussed above. Accordingly, and in contrast to the situation described for workflow diagram 602, if one node within microservice high availability cluster 610 fails, then another node may readily, seamlessly, dynamically, and/or automatically take on the role previously performed by the failing node. Furthermore, in one embodiment, the full mesh network of the cloud computing cluster is self-healing. Additionally, any arbitrary node within the cloud computing cluster is readily capable of receiving microservice request 614, processing the request itself, and/or forwarding the request to another instance of the microservice within the cloud computing cluster (e.g., in accordance with the same algorithm that is executed locally at each cloud computing cluster node).

In general, any permutation of the following features of the disclosed subject matter are independent of method 300 and may be performed in addition, or in alternative, to one or more, or all, of the steps of method 300. First, the cloud computing cluster may detect a failure in at least one node. Second, the nodes of the cloud computing cluster may be homogeneous. For example, the nodes of the cloud computing cluster may execute locally the same algorithm. Third, the algorithm may optionally determine which node should take over the execution of a microservice that was executed previously by the node that experienced failure. Fourth, any given one of the homogeneous nodes of the cloud computing cluster may be able to execute the algorithm, and determine which node will perform the takeover (and when to perform the takeover), due to every one of the nodes possessing state information about the state of every microservice being executed within the cloud computing cluster. The algorithm may also optionally determine which node will take over a leadership position and/or the algorithm may conduct a leadership election. Fifth, the cloud computing cluster may propagate the state information among all the nodes of the cloud computing cluster in an automatic, real-time, and/or dynamic manner, thereby creating a full mesh. Moreover, the full mesh may be self-healing, as further discussed above.

Additionally, in any one or more of the embodiments discussed above, a node of the cloud computing cluster may be considered to be "active" or "passive." An active node of the cloud computing cluster may be actively processing microservice requests. In contrast, a passive node for the cloud computing cluster may be lying in a dormant state until switching to an active mode. In some examples, only one node of the entire cluster may be active at a single time.

Furthermore, in one embodiment, all nodes belonging to the cloud computing cluster dynamically synchronize the first data store for the microservice and the second data store for the distinct second microservice such that each node belonging to the cloud computing cluster (e.g., each node that includes an instance of the first microservice and an instance of the distinct second microservice) maintains access to the first data store for the microservice and the second data store for the distinct second microservice. In the example of FIG. 6, each instance of the same microservice (i.e., microservice instance A, microservice instance B, microservice instance C, and microservice instance D) maintains continuous access to a copy of the same underlying data store for the microservice. Whenever a change is made to the data store, the change is automatically and/or dynamically propagated throughout the cloud computing cluster to every instance of the microservice. Because every instance of the microservice maintains continuous access to a copy of the underlying data store, the cloud computing cluster can more readily handle the failure of an arbitrary network node within the cluster, and then perform a self-healing function, as further discussed above.

The above discussion provides an overview of the disclosed subject matter with reference to method 300 of FIG. 3. Additionally, the following discussion provides a further overview of concrete and detailed embodiments of the disclosed subject matter.

In general, the disclosed subject matter may improve upon related systems that provide cloud computing services. These related solutions may include high availability solutions, such as PACEMAKER. Solutions such as PACEMAKER use an underlying messaging layer (COROSYNC or HEARTBEAT) to synchronize member nodes within a high availability cluster. Unfortunately, the messaging capabilities of these solutions are limited to cluster management and are not available to upper layer applications. Therefore, in order to synchronize service data among microservice instances, an additional implementation of intra-microservice messaging may be used.

As another example of a related system, KAFKA is a popular tool to implement messaging among microservice instances. Although KAFKA also provides a high availability solution, this solution is realized by replicating KAFKA brokers and the solution does not involve a full mesh among all microservice instances, as further discussed above.

In contrast, the disclosed subject matter may include a fully-distributed fault-tolerant real-time cloud service information exchange framework. With this framework, cloud computing nodes may form an interconnected full mesh network to provide high availability for a cloud service with a synchronized service context.

The disclosed subject matter may improve upon related systems in one or more of the following ways. First, the disclosed subject matter may be distributed and/or fault-tolerant. Most conventional approaches to building a cloud computing cluster involve either a master node or a cluster head. In the event of the master node or cluster head becoming unavailable, cloud services may be interrupted until a backup master node or a new cluster head is restored. In contrast, the disclosed subject matter may operate in a fully distributed manner. All computing nodes may be homogeneous in terms of their role in the cloud computing cluster. Because all nodes construct a full mesh, removal of any node will not affect the operation of the cloud service.

Second, the disclosed subject matter may provide a context-aware cloud service information exchange. With this framework, cloud services synchronize their states and operations with all microservice instances in real-time. In this way, when a microservice instance becomes unavailable, other instances can continue to serve. Although the microservice may have been switched from one computing node to another, from the cloud user's perspective, there is no service interruption. The exchange mechanism may be context-aware based on service type. Each service type may have different operational specifications or requested configurations, such as: deterministic delay specifications, encoding/compression specifications, and/or a priority categorization while exchanging service-related data. The disclosed subject matter, including synchronization module 106, may be aware of this contextual information and operate proactively to adapt to the operation environment to ensure the specifications within the contextual information are satisfied.

Third, the disclosed subject matter may enable fully automated recovery of microservice information. In some embodiments, microservice information may be stored persistently in a decentralized manner. Furthermore, synchronization module 106 may redistribute the microservice information (e.g., data base data) among the full mesh of peers when a cluster node recovers. Node recovery may happen either when the system reboots, or when a temporary network outage was detected and resolved. In some examples, this recovery of service information may be fully automated.

The disclosed subject matter is optionally designed for generic cloud services through a set of well-defined application programming interfaces, including one or more of the following. First, in terms of a service context definition, cloud services may define their own service context to be synchronized among peer nodes. Second, in terms of a service operational event definition, cloud services may optionally define what type of service-related data will be exchanged when an operation event occurs. The cloud services may define the event type as well as service-related data that will be broadcast to all other peers in the cloud computing cluster. Third, in terms of a service operational event delay requirement, when broadcasting service operational events to peers, the disclosed subject matter (e.g., synchronization module 106) may check if a deterministic delay specification can be satisfied for the corresponding service-related data type. The disclosed subject matter will optionally filter out stale service-related data either at a broadcaster side or at a receiver site. Fourth, in terms of an operational service multiplier, cloud services may optionally define what microservice should receive and process underlying data store data. A server context may also be updated in response to a new operational event.

Figure 7:
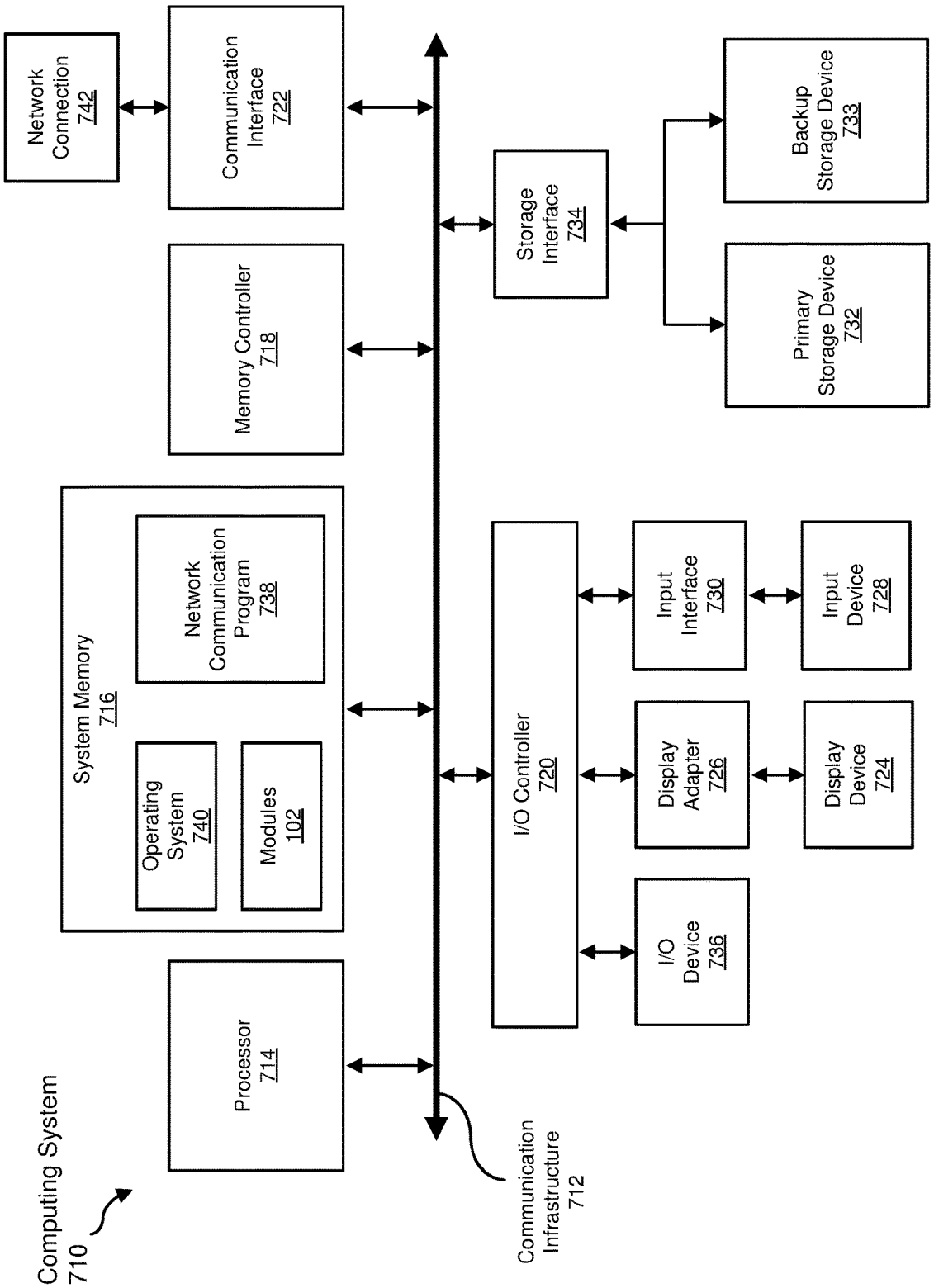
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
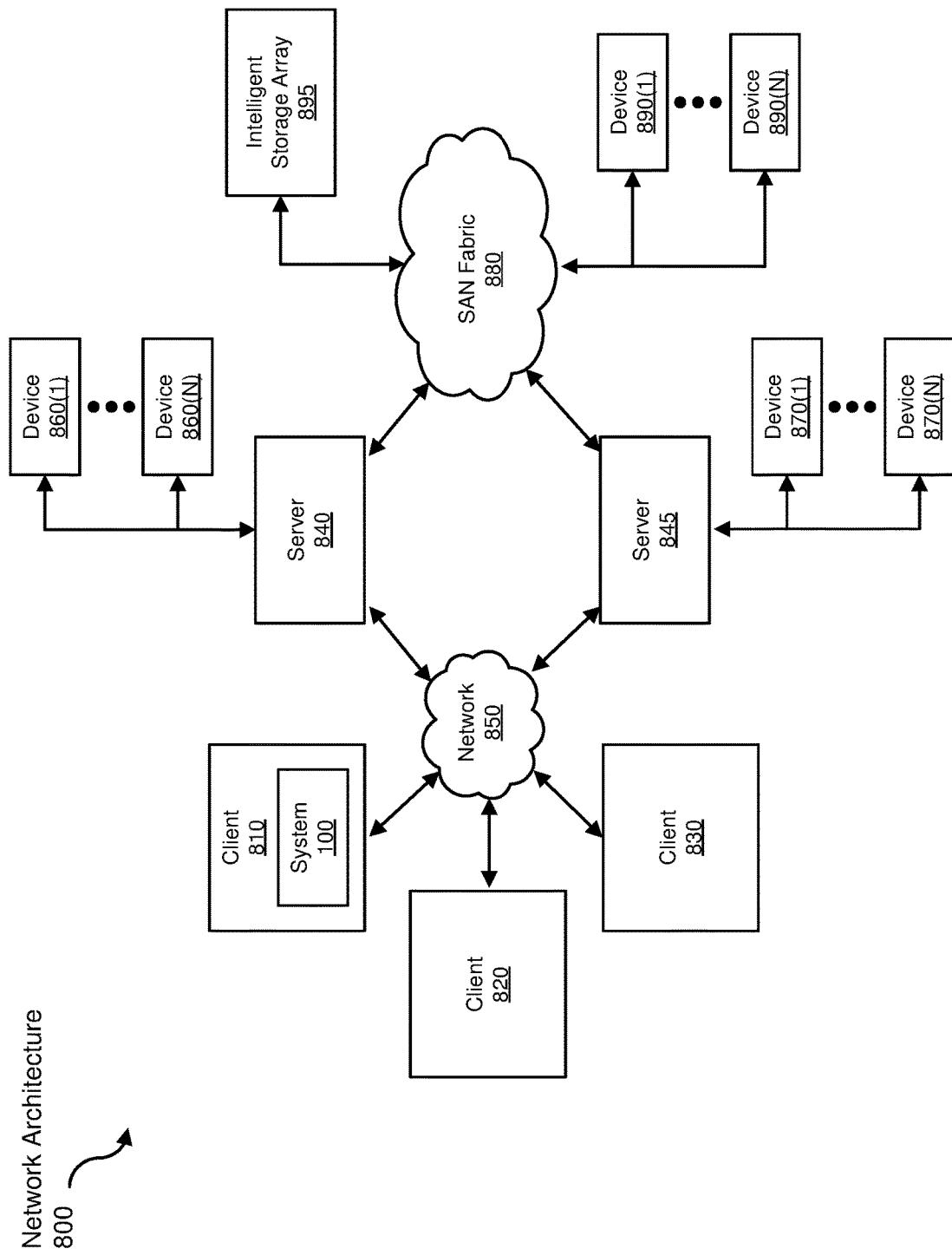
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for synchronizing microservice data stores.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, security as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform the content of a physical memory device by synchronizing a data store for a microservice between two separate network nodes, as further discussed above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for synchronizing microservice data stores, at least a portion of the method being performed by a computing device comprising at least one processor, the method comprising:
    establishing, at a first network node, an instance of a first microservice for an application and an instance of a distinct second microservice;
    establishing, at a distinct second network node, an additional instance of the first microservice and an additional instance of the distinct second microservice;
    establishing a single network channel for synchronizing, between the first network node and the distinct second network node, a first data store for the first microservice and a second data store for the distinct second microservice; and
    synchronizing, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels;
    wherein:
    a synchronization engine schedules a transmission of at least one network packet based on the analysis of the context information for both the first microservice and the distinct second microservice; and
    the network packet includes within a payload data from both the first microservice and the distinct second microservice.

2. The computer-implemented method of claim 1, wherein the context information defines at least one of:
    a specification of delay tolerance; or
    an indication of whether encryption is applied.

3. The computer-implemented method of claim 1, wherein the context information defines at least one of:
    a specification of an update frequency; or
    a priority categorization.

4. The computer-implemented method of claim 1, wherein synchronizing the first data store for the first microservice and the second data store for the distinct second microservice enables high availability of intra-transaction data for a cloud service according to a high availability protocol.

5. The computer-implemented method of claim 1, wherein synchronizing the first data store for the first microservice and the second data store for the distinct second microservice is performed as part of a third-party cloud computing service provided by a security vendor that ensures a level of security to protect users of the application.

6. The computer-implemented method of claim 1, wherein the first network node and the distinct second network node belong to a cloud computing cluster.

7. The computer-implemented method of claim 6, wherein all nodes belonging to the cloud computing cluster are homogeneous such that the cloud computing cluster functions as a full mesh network without a static master node.

8. The computer-implemented method of claim 7, wherein the full mesh network is self-healing.

9. The computer-implemented method of claim 7, wherein all nodes belonging to the cloud computing cluster dynamically synchronize the first data store for the first microservice and the second data store for the distinct second microservice such that each node belonging to the cloud computing cluster maintains access to the first data store for the first microservice and the second data store for the distinct second microservice.

10. The computer-implemented method of claim 1, wherein synchronizing, across the single network channel between the first network node and the distinct second network node, the first data store for the first microservice and the second data store for the distinct second microservice reduces a number of network channels in comparison to synchronizing the first data store and the second data store independently across two separate network channels.

11. A system for synchronizing microservice data stores, the system comprising:
    an establishment module, stored in memory, that:
    establishes, at a first network node, an instance of a first microservice for an application and an instance of a distinct second microservice;
    establishes, at a distinct second network node, an additional instance of the first microservice and an additional instance of the distinct second microservice; and
    establishes a single network channel for synchronizing, between the first network node and the distinct second network node, a first data store for the first microservice and a second data store for the distinct second microservice;
    a synchronization module, stored in memory, that synchronizes, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels; and
    at least one physical processor configured to execute the establishment module and the synchronization module;
    wherein:
    a synchronization engine schedules a transmission of at least one network packet based on the analysis of the context information for both the first microservice and the distinct second micro service; and the network packet includes within a payload data from both the first microservice and the distinct second microservice.

12. The system of claim 11,
wherein the context information defines at least one of:
a specification of delay tolerance; or
an indication of whether encryption is applied.

13. The system of claim 11, wherein the context information defines at least one of:
a specification of an update frequency; or
a priority categorization.

14. The system of claim 11, wherein the synchronization module synchronizes the first data store for the first microservice and the second data store for the distinct second microservice in a manner that enables high availability of intra-transaction data for a cloud service according to a high availability protocol.

15. The system of claim 11, wherein the synchronization module synchronizes the first data store for the first microservice and the second data store for the distinct second microservice as part of a third-party cloud computing service provided by a security vendor that ensures a level of security to protect users of the application.

16. The system of claim 11, wherein the first network node and the distinct second network node belong to a cloud computing cluster.

17. The system of claim 16, wherein all nodes belonging to the cloud computing cluster are homogeneous such that the cloud computing cluster functions as a full mesh network without a static master node.

18. The system of claim 17, wherein the full mesh network is self-healing.

19. The system of claim 17, wherein all nodes belonging to the cloud computing cluster dynamically synchronize the first data store for the first microservice and the second data store for the distinct second microservice such that each node belonging to the cloud computing cluster maintains access to the first data store for the first microservice and the second data store for the distinct second microservice.

20. A non-transitory computer-readable medium comprising one or more computer-readable instructions that, when executed by at least one processor of a computing device, cause the computing device to:
establish, at a first network node, an instance of a first microservice for an application and an instance of a distinct second microservice;
establish, at a distinct second network node, an additional instance of the first microservice and an additional instance of the distinct second microservice;
establish a single network channel for synchronizing, between the first network node and the distinct second network node, a first data store for the first microservice and a second data store for the distinct second microservice; and
synchronize, across the single network channel between the first network node and the distinct second network node, the first data store for the first microservice and the second data store for the distinct second microservice, such that the synchronizing is adjusted based on an analysis of context information for both the first microservice and the distinct second microservice, rather than synchronizing the first data store and the second data store independently across two separate network channels;
wherein:
a synchronization engine schedules a transmission of at least one network packet based on the analysis of the context information for both the first microservice and the distinct second micro service; and
the network packet includes within a payload data from both the first microservice and the distinct second microservice.

\* \* \* \* \*